:::

United States Patent
Pampana et al.

(10) Patent No.: US 11,336,503 B2
(45) Date of Patent: May 17, 2022

(54) CO-MANAGEMENT ELIGIBILITY AND ENROLLMENT

(71) Applicant: Microsoft Technology Licensing, LLC, Redmond, WA (US)

(72) Inventors: Venkata Raghuram Pampana, Redmond, WA (US); Loretta Marie Macklem-Clements, Redmond, WA (US); Annie Guo Joli-Coeur, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/912,510

(22) Filed: Jun. 25, 2020

(65) Prior Publication Data
US 2021/0351972 A1 Nov. 11, 2021

Related U.S. Application Data

(60) Provisional application No. 63/022,421, filed on May 8, 2020.

(51) Int. Cl.
*H04L 41/042* (2022.01)
*H04L 41/0853* (2022.01)
(Continued)

(52) U.S. Cl.
CPC ........ *H04L 41/042* (2013.01); *H04L 41/0853* (2013.01); *H04L 41/0883* (2013.01); *H04L 41/0893* (2013.01); *H04L 41/22* (2013.01)

(58) Field of Classification Search
CPC ... H04L 41/042; H04L 41/0883; H04L 41/22; H04L 41/0853; H04L 41/0893
See application file for complete search history.

(56) References Cited

U.S. PATENT DOCUMENTS 10,395,027 B2 * 8/2019 Roszak ................. G06F 21/62
2012/0179802 A1 7/2012 Narasimhan et al.
(Continued)

OTHER PUBLICATIONS

Part 11 Co-management—ConfigMgr CB and the Microsoft cloud platform, Steven Rachui, YouTube (video) published Apr. 25, 2019. Retrieved from the Internet <https://www.youtube.com/watch?v=6ZNMQsJXY9E> p. 1-10 (Year: 2019).*
(Continued)

*Primary Examiner* — Tonia L Dollinger
*Assistant Examiner* — Joseph M Cousins
(74) *Attorney, Agent, or Firm* — Rainier Patents, P.S.

(57) ABSTRACT

This document relates to a process for managing remote devices within an organization. Upon receiving device state information from the remote device, a cloud-based management server can analyze the device state information of the remote devices, and categorize the remote devices into a number of categories that reflect each device's state with respect to co-management enrollment. The categories can be presented to a user in order to provide a comprehensive view of the state of various remote devices in relation to their co-management state. Various co-management enrollment actions can then be issued to the remote devices in order to enroll a device in co-management, or upgrade a co-management category associated with the device.

21 Claims, 8 Drawing Sheets

:::

(51) Int. Cl.
*H04L 41/08* (2022.01)
*H04L 41/22* (2022.01)
*H04L 41/0893* (2022.01)

(56) References Cited

U.S. PATENT DOCUMENTS

| | | | |
|---|---|---|---|
| 2019/0114203 A1* | 4/2019 | James | H04L 41/046 |
| 2020/0004582 A1 | 1/2020 | Fornash et al. | |
| 2020/0007584 A1* | 1/2020 | Dixit | G06F 16/2246 |
| 2020/0092374 A1* | 3/2020 | Mehta | G06F 21/121 |
| 2020/0228560 A1* | 7/2020 | Murthy | G06F 21/577 |
| 2021/0083946 A1* | 3/2021 | Deane | H04L 41/22 |
| 2021/0119874 A1* | 4/2021 | Ryman | H04L 41/042 |

OTHER PUBLICATIONS

Part 10 Co-management—ConfigMgr CB and the Microsoft cloud platform, Steven Rachui, YouTube (video) published Apr. 25, 2019. Retrieved from the ilternet <https://www.youtube.com/watch?v=GNodP_m6cus> p. 1-4 (Year: 2019).*

Transition to cloud-based management of Windows 10 and Office 365 ProPlus with EMS—BRK3076, Maayan BAr-Niv, YouTube (video) published Sep. 29, 2017. Retrieved from the Internet <https://www.youtube.com/watch?v=U9OvcpQVpL0> p. 1-4 (Year: 2017).*

"International Search Report and Written Opinion issued in PCT Application No. PCT/US2021/028047", dated Jul. 16, 2021, 14 Pages.

* cited by examiner

DASHBOARDS > DEVICES | ALL DEVICES
■ DEVICES | ALL DEVICES

300

| Search |
|---|

- ⓘ OVERVIEW

MANAGE
- 🖳 ALL DEVICES ← 302
- ◆ AZURE AD DEVICES
- 🔔 SEND CUST. NOTIF.

MONITOR
- ■ DEVICE ACTIONS
- ■ CO-MANAGEMENT ELIG.
- ■ DEVICE CLOUD USAGE
- ■ CO-MANAGEMENT WORK

SETUP
- ⌖ TEAMVIEWER CONN.
- 🗑 DEVICE CLEANUP

HELP AND SUPPORT
- ⓗ HELP AND SUPPORT

⟳ REFRESH    FILTER    COLUMNS    EXPORT    BULK DEVICE ACTIONS ⓘ YOU HAVE 10,000 DEVICES THAT CAN UTILIZE MORE CLOUD CAPABILITIES, TO SEE A DETAILED ANALYSIS: <u>CLICK HERE</u>

304

| Search |
|---|

| DEVICE NAME | MANAGED BY | OWNERSHIP | COMPLIANCE | OS | OS VERSION |
|---|---|---|---|---|---|
| DESKTOP-9 | INTUNE | PERSONAL | NOT EVAL... | WINDOWS | 10.0.1103.778 |
| IUSER6-WIND | INTUNE | UNKNOWN | COMPLIANT | WINDOWS | 0.0.0.0 |
| WINDOWS10- | INTUNE | PERSONAL | COMPLIANT | WINDOWS | 0.0.0.0 |

DASHBOARDS > DEVICES | DEVICE CLOUD USAGE REPORT

DEVICES | DEVICE CLOUD USAGE REPORT

Search

ⓘ OVERVIEW

MANAGE
- ALL DEVICES
- AZURE AD DEVICES
- SEND CUST. NOTIF.

MONITOR
- DEVICE ACTIONS
- CO-MANAGEMENT ELIG.
- DEVICE CLOUD USAGE
- CO-MANAGEMENT WORK

SETUP
- TEAMVIEWER CONN.
- DEVICE CLEANUP

HELP AND SUPPORT
- HELP AND SUPPORT

ⓘ TO LEARN ABOUT MAXIMIZING CLOUD USAGE AND UPGRADING DEVICE CLOUD TIERS: CLICK HERE

— 402

- ON PREM — 5 DEVICES
- CLOUD TIER 1 — 7 DEVICES
- CLOUD TIER 2 — 9 DEVICES
- CLOUD TIER 3 — 11 DEVICES
- CLOUD TIER 4 — 15 DEVICES

47

— 406

Search — 404

| DEVICE NAME | CLOUD TIER | MANAGED BY | DEVICE STATE | INTUNE REGISTERED | OS VERSION |
|---|---|---|---|---|---|
| R6116994 | ONPREM | CONFIGMGR | MANAGED | YES | 10.0.18363.476 |
| R6116999 | CLOUDTIER1 | CONFIGMGR | MANAGED | YES | 10.0.18363.476 |
| R6116990 | CLOUDTIER2 | CONFIGMGR | MANAGED | YES | 10.0.18363.476 |

METHOD 800

FIG. 8

CO-MANAGEMENT ELIGIBILITY AND ENROLLMENT

BACKGROUND

In certain organizational environments, large numbers of devices may be deployed throughout the organization in order to enable members of the organization to conduct various tasks. The management of these devices may be performed by an IT administrator, who may utilize a system center configuration manager (SCCM) in order to monitor resource availability, device statuses, hardware or software issues, and upgrading or installation of software, among other tasks. The SCCM may be a local system management suite that can provide the IT administrator with a comprehensive view of the organization's local device infrastructure. However, with an increasing shift toward work-from-home programs and placement of an organization's servers in remote server farms, many devices associated with an organization may be located remotely from the organization's premises. Furthermore, an IT administrator may be remotely located from an organization's office, and can have reduced local access to devices. As such, an IT administrator that relies solely on an SCCM may have reduced visibility of remote devices, and there remain difficulties in managing local and remote devices in a convenient manner.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

As organizations move toward remote deployment of devices associated with the organization, efficient management of such devices can become difficult for an IT administrator. Typically, an IT administrator may rely on a local manager, such as an SCCM, in order to properly manage the organization's devices, but the SCCM may provide a limited picture of the organization's remote devices that may be accessible via the cloud. Furthermore, the SCCM may primarily benefit only local devices within the organization, and benefits associated with cloud management of devices may be unavailable.

In this instance, incorporating cloud management of an organization's devices can be beneficial, but typically an SCCM may not integrate efficiently with a cloud manager, and it can be difficult for an IT administrator utilizing the SCCM to get a clear picture of the various states of each device within the organization, and what prerequisites may be necessary in order for devices to achieve cloud management. And while integrating the SCCM with a cloud-based service can provide certain visibility to the cloud service, typically the cloud service does not have adequate permissions to perform actions on the remote device, such that the cloud service cannot effectuate any upgrading or modification of the devices. Instead, the cloud service typically can provide only limited visibility on the state of the remote device.

To address these issues, devices within the organization can be enrolled in co-management of the devices, which can be a method of concurrently managing the organization devices both locally and via the cloud. Importantly, co-management can provide greater functionality to an IT administrator in that the cloud service can effectuate changes on the local devices, such as by invoking low-level APIs associated with the device. By providing more control to the cloud service, a wide variety of functional benefits can be gained, such as the ability to restart, perform remote control, install/upgrade various settings, or perform a factory reset. Furthermore, co-management can allow the IT administrator to shift workloads between local handling with the SCCM and remote handling by the cloud-based management solution. Proper co-management between the SCCM and the cloud-based management solution can ensure that workloads remain balanced, and that no conflicts arise between the workload sharing. Additionally, co-management of the devices can allow an IT administrator to effectuate changes to any device within the organization, regardless of whether the device is local or remote.

However, upgrading local devices to a co-management framework can present difficulties, as the state of each local device may need to be determined prior to upgrading. For example, in an organization with 10,000 different devices, the states of those devices may need to be determined in order to ascertain whether each device meets prerequisites for upgrading to co-management. Furthermore, even with the devices that meet the prerequisites for upgrading, there may be intermittent failures during the upgrading process, and individually accessing each device that failed to ascertain the relevant errors can become tedious for an IT administrator, as it is often difficult to localize particular errors to particular devices.

As such, processes disclosed herein can utilize a cloud-based management system that can be configured to request device state information and receive, in response, device state information associated with the devices located at the organization. Such information can be provided, for example, by a reporting module that may be associated with the SCCM, which can coordinate with the cloud service to present greater visibility of the local devices to a user of the cloud service. Utilizing this information, the system may generate a co-management eligibility report, which may provide data to the IT administrator regarding what devices in the organization may be eligible for enrollment in co-management. The eligibility report may also provide guidance to the IT administrator regarding the various states of devices, such as by indicating that certain devices may be eligible for co-management enrollment, but that certain steps may be necessary for proper enrollment of the device.

For example, 5,000 devices may be eligible for co-management, but may have varying problems that may need addressing before being co-managed such as needing an OS upgrade, or needing to join a cloud-based identity and access management (IAM) service, such as Azure Active Directory (AAD), VMware Workspace ONE, or AWS Identity & Access Management. It can be difficult for IT administrators to gather and process the various states of the organization's devices, so the reporting module can gather relevant state information for the devices within the organization, and provide the state information to the cloud service for processing. Upon receipt of the state information, the cloud service can analyze the various information regarding the devices, and can compile insight information through interaction with other cloud services, such as the IAM service.

Based at least on the analyzed information associated with the devices, the cloud service can categorize the various devices into buckets that may be used to indicate to the IT administrator the various states of the devices. For example, the cloud service may categorize devices into various determined co-management categories or "buckets" that may represent their state with respect to co-management eligibility, such as 1) "Ineligible," 2) "Needs OS upgrade," 3) "Needs Identity Management Join," 4) "Eligible," 5) "Attempted/Failed Enrollment," and 6) "Co-managed." It is to be appreciated that such buckets are merely examples, and various other categorization may be utilized in place of, or in addition to, the examples listed.

Upon categorizing the various devices, a graphical user interface (GUI) may be presented to the IT administrator that can visually depict the categorization, along with potential insight information on how the IT administrator may improve co-management states of the devices. For example, the GUI may present information to the IT administrator indicating that a number of devices within the organization may be eligible for upgrading to additional tiers of co-management, which can provide greater functionality in terms of managing the organization's devices.

As such, processes disclosed herein can provide a centralized cloud-based dashboard that can present to an IT administrator a comprehensive view of devices within the organization. By utilizing a reporting agent local to the SCCM, the state of local on-premises devices can be determined and cataloged by a cloud service. Upon processing the various devices associated with the organization, a GUI can be presented to the IT administrator that specifies the state of the various devices of the organization, along with various options that may improve the management of the devices.

Figure 1:
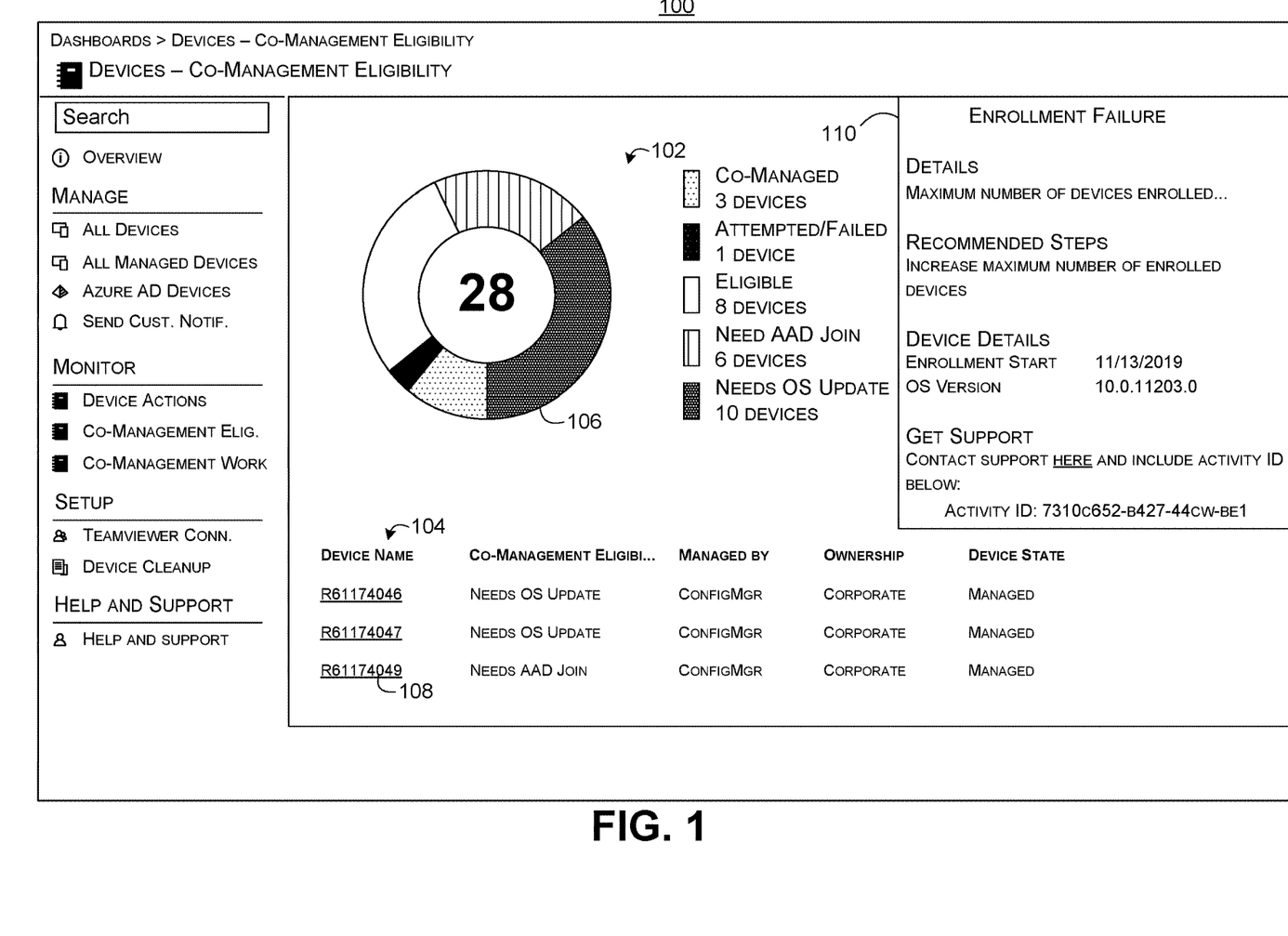
FIGS. 1-4 illustrate example graphical user interfaces that are consistent with some implementations of the present concepts.

FIG. 1 depicts an example GUI 100, which may be presented to an IT administrator based on the analysis of the various devices at remote locations. As depicted, GUI 100 may include a graphic element 102 that can depict a graphical summary of the remote devices by category grouping. The categories may correspond to the various buckets that the cloud service categorized during initial analysis of remote device data. For example, as depicted, graphic element 102 can indicate that 3 devices are currently co-managed, 1 device has attempted to enroll in co-management but has failed, 8 devices are currently eligible for enrollment, 6 devices may need an identity management server join (such as an AAD join operation), and 10 devices may need OS upgrades before being eligible for enrollment.

GUI 100 may also present a device listing 104, which can display details regarding each of the remote devices along with their current state. Device listing 104 can further be filtered, such as by selecting a portion of graphic element 102 to filter devices to a certain category. For example, an IT administrator may select portion 106, which may then cause device listing 104 to depict a listing of devices that need an OS update. The devices listed in device listing 104 may be individually selectable via one or more selectable links in order to display a screen particular to the selected device. For example, an IT administrator may select link 108 to view details associated with that particular device.

It is to be appreciated that device listing 104 may alternatively allow for the selection of multiple devices in order to perform batch processing for multiple remote devices. For example, an IT administrator may select portion 106 to cause a selection of all remote devices that fall within that category. The IT administrator may then initiate certain processing for the selected category of remote devices. For example, upon receiving a user selection of portion 106, instructions may be issued to and stored on individual remote devices that fall within the category represented by portion 106 or otherwise qualify for co-management, where the instructions can cause a change in the co-management functionality of the devices according to the received user selection. Upon executing the instructions issued to the devices, a state of the devices can change and a greater amount of functionality can be realized for the devices.

However, in certain instances, a selection of all devices that may be represented in a portion of the graphical user interface may produce a heavy workload burden on the organization. For example, if 25,000 devices were selected from an organization, and all were instructed to perform co-management enrollment, the parallel processing may cause a breakdown of network capabilities. As such, workload can be managed, and orchestration of the device enrollment can be managed where certain devices are scheduled for enrollment processing over a weekend when network requirements are less critical. Alternatively, the workload can be managed such that if a request to enroll remote devices is received during heavy business hours, the enrollment schedule may be scaled back.

GUI 100 may also display an information pane 110 that may provide specific information regarding categories of devices. For example, GUI 100 may default to displaying details regarding devices that have failed in their attempts to enroll in co-management. As such, information pane 110 may display failed enrollment details regarding why the device potentially failed, and additional steps that may be taken by the IT administrator to remedy the failure.

Figure 2:
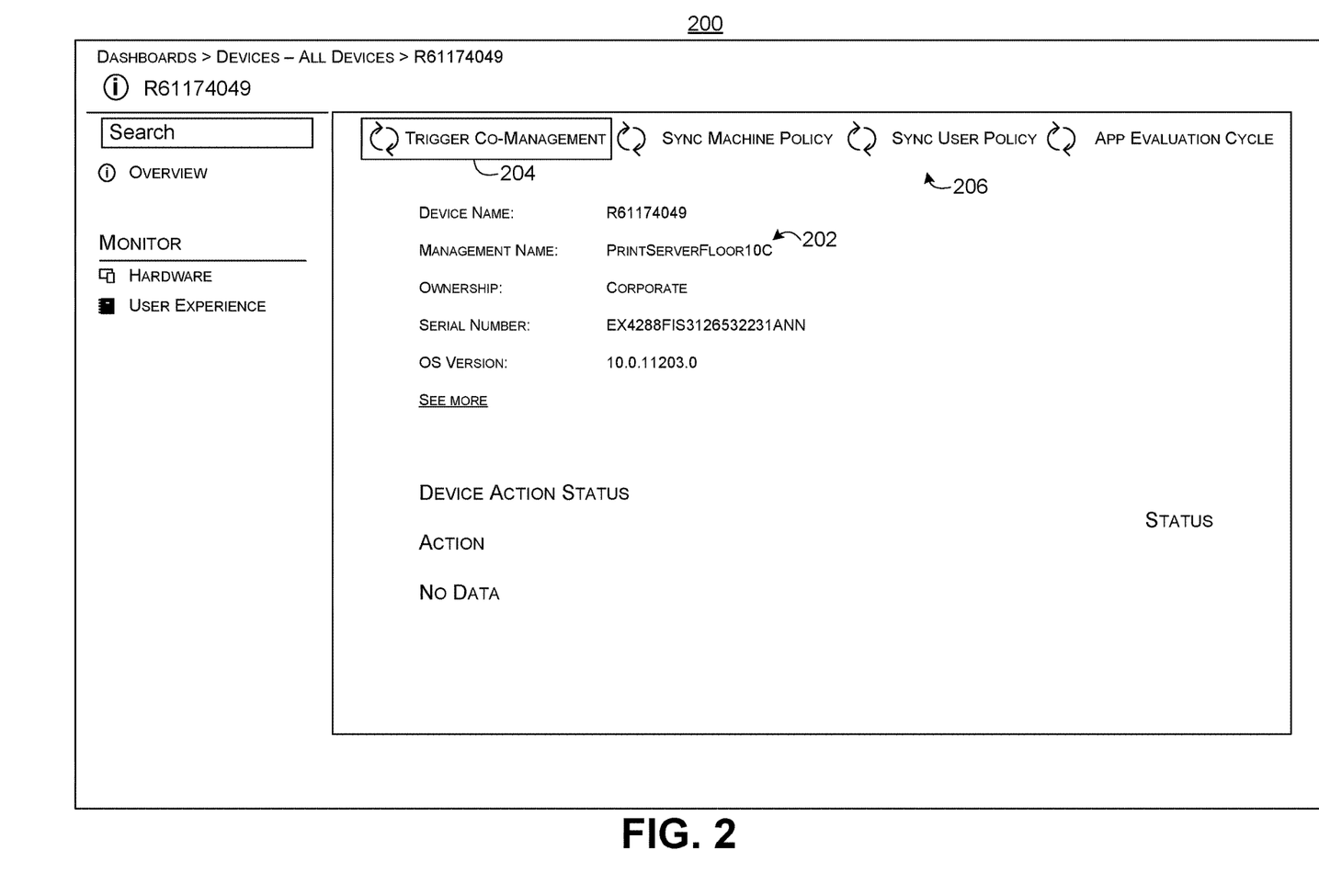

FIG. 2 depicts an example GUI 200, which may be displayed upon an IT administrator selecting link 108. GUI 200 may display a details panel 202 that can provide specific information regarding the selected device. For example, merely identifying the device name may provide little information for the IT administrator, and by consulting details panel 202, the IT administrator can determine that the device may correspond to a print server located on the 10th floor of the organization's complex, thereby providing additional insight to the remote device. The IT administrator can manually trigger a cloud-based co-management enrollment action by selecting option 204, which can initiate immediate enrollment of the device without any user involvement at the device end. It is to be appreciated, however, that the IT administrator could provide a specific date and time for enrollment to occur, in order to ensure that the remote device is not taken out of service during critical times, such as during business hours.

In certain instances, the selected device may not be currently eligible for co-management enrollment, in which case option 204 may be grayed out. An IT administrator can utilize options 206 to perform certain steps that may be prerequisites to enrollment, such as syncing policies of the device, and evaluating current states of installed applications to confirm necessary versions are present.

Figure 3:
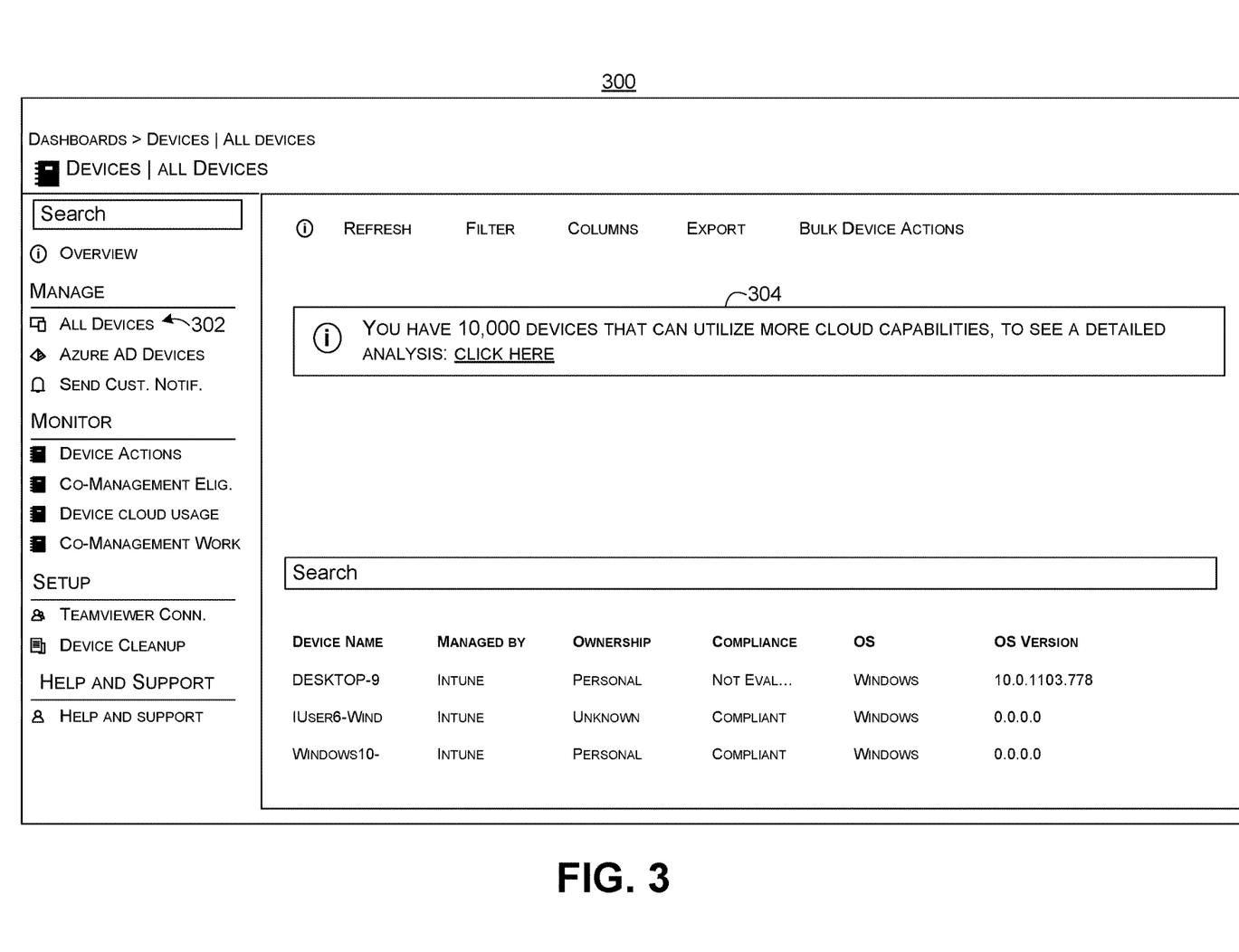

FIG. 3 depicts an example GUI 300, which may be presented to an IT administrator upon selection of an option 302 to display all devices associated with an organization, in order to see a general overview of the various devices. GUI 300 may provide insight information 304, which can provide various information regarding insights that may have been gleaned from analysis of the remote device information. For example, the analysis may have determined that several devices may be eligible for upgrading to different co-management tiers.

In addition to the categorization of devices that are eligible for co-management enrollment, such as the categories depicted in FIG. 1, the cloud service may also determine co-management tier categories. For example, the cloud service may define a series of tiered management levels as set forth below in Table 1:

TABLE 1

| Tier | Devices in Bucket | Cloud Value |
|---|---|---|
| Tier 0 | On-prem devices | No value |
| Tier 1 | Cloud attached devices | Cloud console, remote actions |
| Tier 2 | Co-managed devices | Tier 1 + cloud managed, device actions |
| Tier 3 | Co-managed devices with workloads swung over | Tier 2 + compliance, Windows Hello for Business, Windows Update for Business, settings |
| Tier 4 | Co-managed Autopilot capable devices | Tier 3 + upgrading devices to Autopilot through hardware harvesting |

Thus, GUI 300 may present information to an IT administrator that certain devices may be eligible for upgraded tiers, and can present a link for selection that can allow the IT administrator to see more details regarding these upgrades. The upgraded co-management tier categories may provide, for example, additional functionality features, such as the ability to swing workload between certain devices when devices are enrolled in Tier 2. Thus, as a device increases to higher tiers in the co-management tier categories, additional co-management functionality may be available to the IT administrator.

Figure 4:
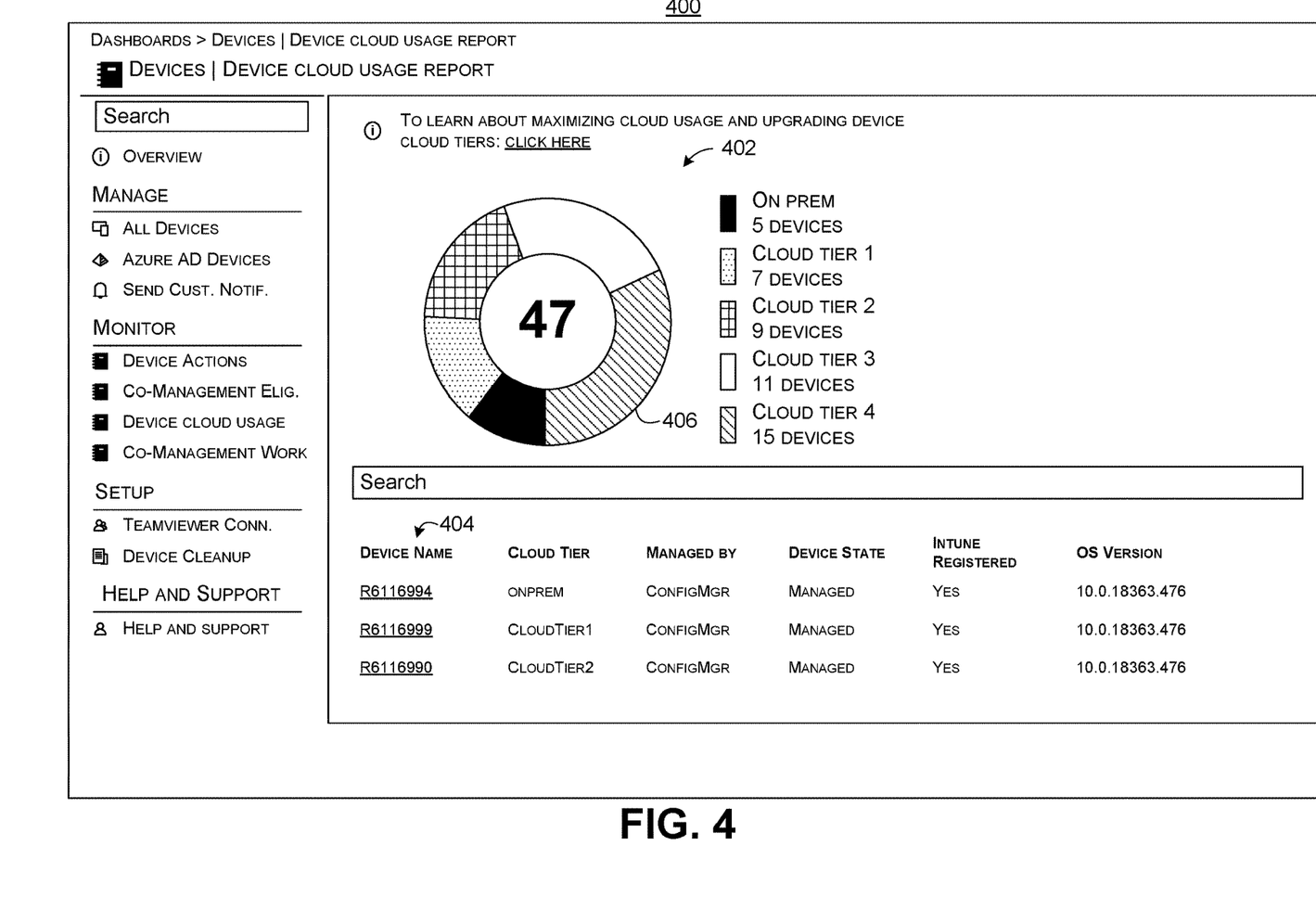

FIG. 4 depicts an example GUI 400 which may be displayed upon the IT administrator selecting to view more information regarding upgraded tiers. As depicted, GUI 400 can include a graphic element 402, which may depict the overall categorization of devices within the organization and the relevant tiers that the devices are "bucketed" into. For example, graphic element 402 may indicate that 5 devices are "on-prem" devices, which may indicate that they are not yet enrolled in co-management as they are solely managed locally. Graphic element 402 may also indicate that a number of devices are scattered among tiers 1-4, in order to provide to the IT administrator a comprehensive view of the states of the various remote devices.

GUI 400 can further include a device listing 404, which may provide cloud tier information regarding the devices. Furthermore, individual devices can be selectable from device listing 404, in order to display detailed information regarding the selected device, such as via an information pane that may be displayed similar to information pane 110. Finally, an IT administrator may select portions of graphic element 402 in order to filter device listing 404, such as by selecting portion 406 in order to filter device listing 404 to devices that are cloud tier 4 devices.

Figure 5:
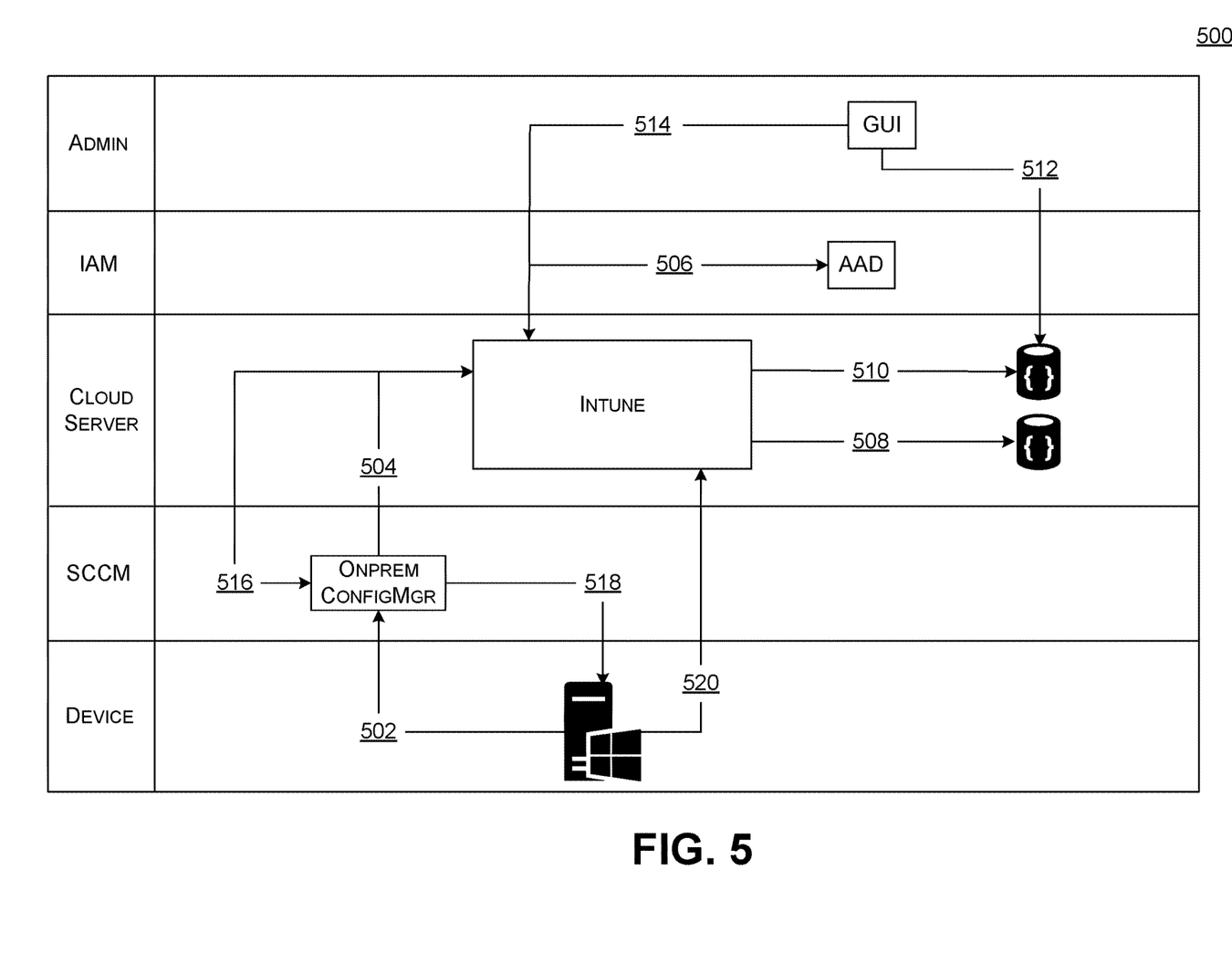
FIGS. 5 and 6 illustrate example process flows that are consistent with some implementations of the present concepts.

FIG. 5 depicts an example process 500, which describes the steps associated with enrollment eligibility in greater detail when initiated on-premises. Process 500 can be initiated at step 502 by having the remote device communicate directly with the SCCM, where the device may provide relevant information about the device's configuration to the SCCM. As depicted in FIG. 5, the SCCM may be an on-premises Configuration Manager, which may be a portion of Microsoft Endpoint Manager, for example. However, it is to be appreciated that any such systems management software product can be utilized as the SCCM, such as vCenter Server from VMware.

The SCCM can then send the device information and the current co-enrollment status up to a cloud service at step 504. As depicted in FIG. 5, the cloud service may provide various services through a cloud-based enterprise mobility management solution, such as Microsoft Intune, for example. However, it is to be appreciated that any such cloud enterprise mobility management solution may be utilized, such as Airwatch by VMware or XenMobile by Citrix.

Upon receiving the device information and co-enrollment status of the device, at step 506, the cloud service can access the IAM service in order to receive identity information that can enable the device to join the device manager hosted by the cloud service. For example, in one implementation, the IAM service can be AAD, and in such an implementation, the cloud service can retrieve AAD join operation details from the IAM service, which can then be used to enroll the device into co-management. Once the identity information is retrieved, the cloud service can analyze the device configuration in order to determine whether the device is currently capable of enrollment in co-management.

In certain instances, the device may lack a particular data value, such as a sufficient OS version, which may be a prerequisite before enrollment of the device can occur. As such, at step 508, the cloud service can access an enrollment requirements database, where the current device configuration can be compared to prerequisites that may be established for enrollment of devices in co-management. Such prerequisites may be established by, for example, the IT administrator, who may wish to ensure that any device enrolled in co-management necessarily has a certain version of an operating system. Alternatively, the prerequisites may be established based on requirements of the cloud service and/or IAM service.

Based at least on data that may be provided by the enrollment requirements database, at step 510, the cloud service can then analyze the various state information of devices that are either eligible for co-management, or that may be enrolled in a reduced tier of co-management. Based on this analysis, actionable reports can be generated and stored in a reports database, which may provide the information that is depicted in GUIs 100, 200, and/or 300. Finally, at step 512, an IT administrator can query the co-management service for data, which can access reports database in order to present the various GUIs on a user interface utilized by the IT administrator, such that the IT administrator can decide to take certain actions with respect to the remote devices.

Upon determining the state of the various remote devices, the IT administrator can then proceed with enrolling devices into co-management and/or upgrading various devices into appropriate tiers of co-management. At step 514, having reviewed the reports that are stored in the reports database, the IT administrator may trigger co-management enrollment on eligible devices via the user interface, such as via GUI 100. For example, as set forth with respect to FIG. 1, the IT administrator may select a particular device from device listing 104, and upon display of GUI 200, may select certain co-management enrollment actions to be applied to the selected device. Such actions can include, for example, initiating an operating system update on a device, issuing a command for the device to join an IAM service, or a command to review additional co-management tier requirements and how to upgrade a device to a new co-management tier.

Upon receiving the co-management command from the IT administrator, the cloud service can issue relevant commands and/or queries to the SCCM at step 516. For example, the cloud service may have received instruction from the IT administrator to modify certain settings on a device, because the IT administrator received notice that the device failed in its prior attempt to enroll into co-management. As depicted in FIG. 1, information pane 110 may have displayed relevant information to the IT administrator regarding why the device potentially failed during co-management enrollment.

Accordingly, the IT administrator may have instructed cloud service to remedy the problem associated with the device, and cloud service can therefore check with the SCCM to determine the appropriate actions to perform in order to fulfill the IT administrator's instructions. With reference again to information pane 110, the failure reason may have specified that the maximum number of enrolled devices has been reached, and that a recommendation of increasing the maximum number of enrolled devices should fix the problem. Therefore, as a result of receiving an instruction to increase the maximum number of enrolled devices and reattempt enrollment of the device, the cloud service can issue commands to the SCCM to perform the necessary actions.

At step 518, the SCCM can issue instructions to the device to perform any necessary actions that may be required on the device for co-management enrollment to succeed. In the above example of increasing the maximum number of enrolled devices, certain changes may not be required of the device, but the device may still require a command from the SCCM to reinitiate certain enrollment steps. Alternatively, if the device needed an OS upgrade for enrollment to succeed, the SCCM can issue OS updates to the device, along with instructions for applying the updates and initiating enrollment steps upon completion of installation.

Finally, at step 520, having successfully completed co-management enrollment, the device can communicate directly with the cloud service to allow the cloud service to provide management of the device in addition to the management of the device provided by the SCCM. Specifically, an agent local to the device can be configured to approve actions issued from the cloud service by exposing certain API settings that allow the cloud service to have management control over the device.

Figure 6:
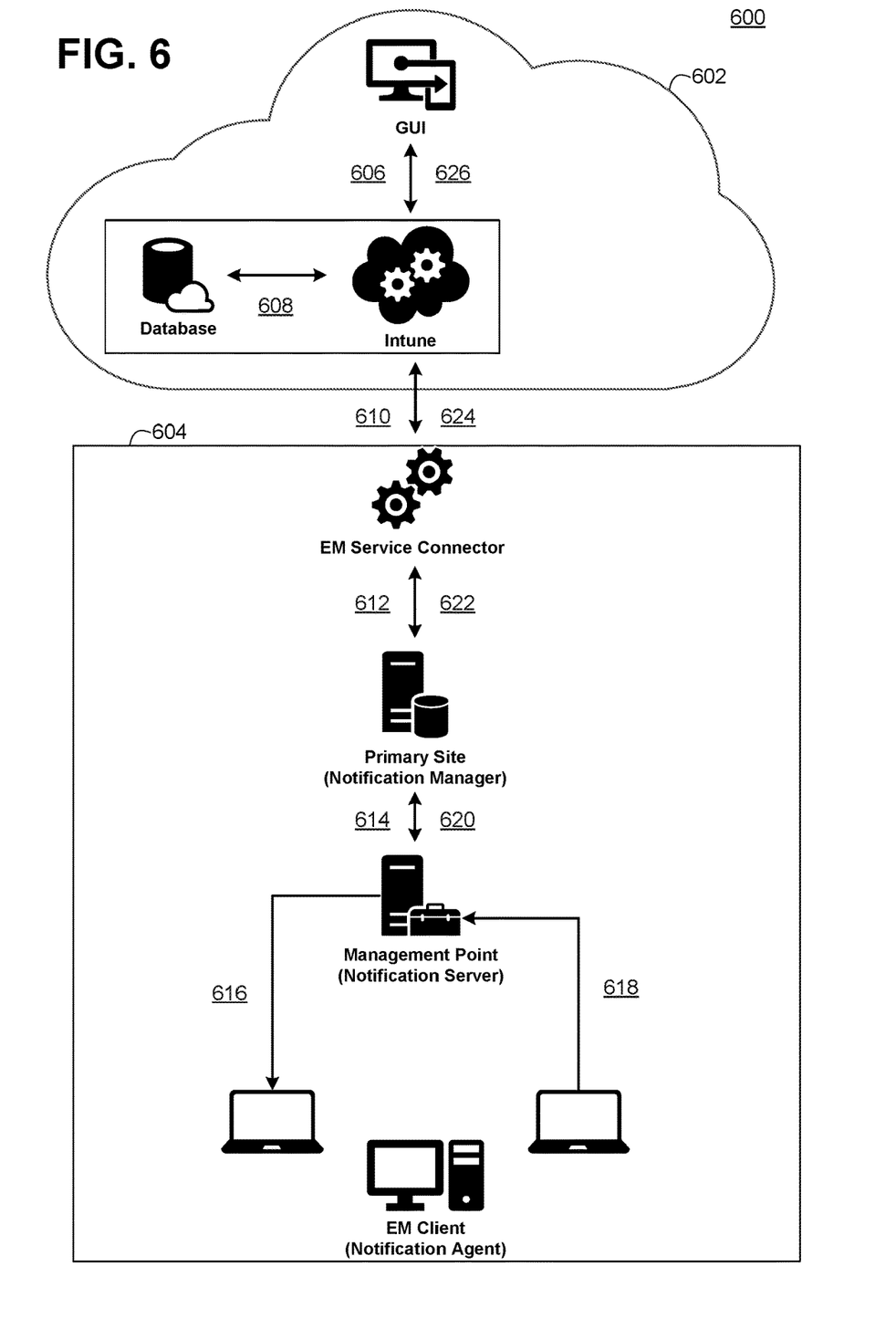

FIG. 6 depicts an example process 600, which describes the message flow during co-management between the cloud service located within a cloud environment 602 and one or more remote devices located within on-premises environment 604 in greater detail. Process 600 can begin at step 606, where upon receiving an instruction from an IT administrator via, for example, GUIs 100, 200, 300, or 400, a notification regarding the requested action can be issued to the cloud service, which is depicted in FIG. 6 as an Intune enterprise mobility management solution. The notification can be forwarded to a notification API, which can be an API of various functions that can be performed in the co-management of a device, such as instructing a client to install a software update, or executing a certain action.

At step 608, the cloud service can validate the notification, and can store the notification in a database that can catalog the various co-management processes that have been performed for a particular device. The database may be associated with the cloud service, or may be a separate database external to the cloud service. At step 610, the notification can then be provided to an endpoint management connector, which may be a service for providing synchronization between the cloud service and the SCCM. The endpoint management connector can validate and deserialize the notification at step 612, and based on validation of the notification, can create a client notification task which can be provided to a notification manager associated with the SCCM for storing within a client notification queue at the notification manager.

At step 614, the notification server can detect that a task request has been provided into the queue, and can extract the task request from the queue. The notification server can then push a message regarding the task to a notification agent that may be operating on the managed client devices. At step 616, the notification agent operating on the managed device can receive the pushed message, and can execute actions specified by the pushed message, which may result in appropriate writing of files or modifications of settings of the managed device.

At step 618, the managed device can send a client notification response back to the notification server, specifying the result of the requested task. For example, the client notification response may indicate whether the assigned task operated successfully, or whether an error occurred during processing. Upon receiving the notification from the managed device, the notification server can store the results provided by the managed device back into the client notification queue of the notification manager at step 620. At step 622, the notification manager can read the client notification response to determine the results of the requested action. For example, the notification manager can parse the client notification response to determine that the co-management operation failed, due to a managed device not having certain prerequisite settings that may be required.

Having parsed the client notification response, at step 624, the notification manager can issue an update to the database to reflect the results of the action taken at the managed device. The message can be passed via the endpoint management connector, which can utilize the notification API of the cloud service in order to store the device action results in the database. Finally, at step 626, the cloud service can report the results of the instruction to the IT administrator via the GUI.

Example System

Figure 7:
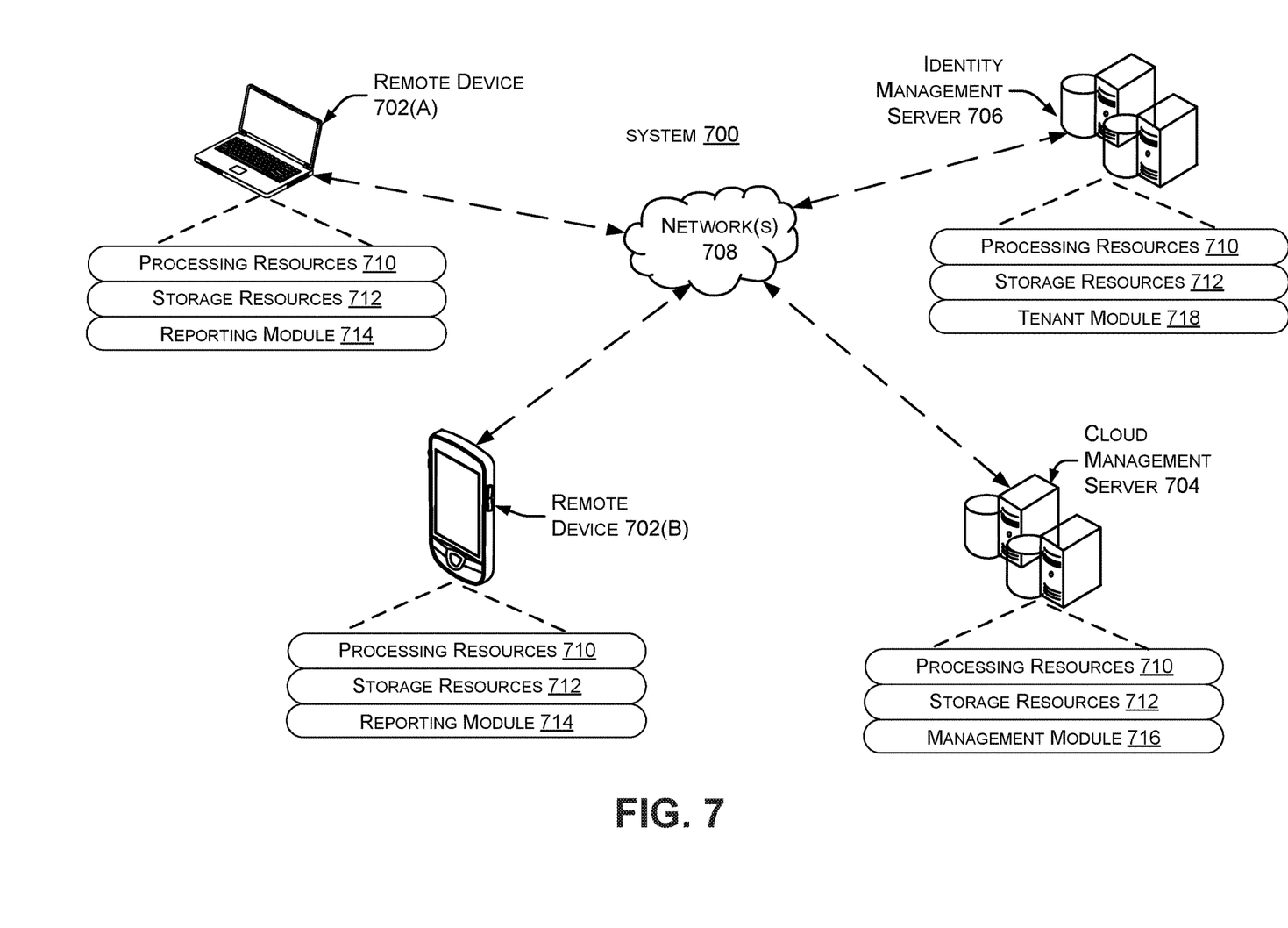
FIG. 7 illustrates an example system, consistent with some implementations of the present concepts.

The present implementations can be performed in various scenarios on various devices. FIG. 7 shows an example system 700 in which the present implementations can be employed, as discussed more below.

As shown in FIG. 7, system 700 can include remote device(s) 702(A) and 702(B), cloud management server 704, and identity management server 706. Each of the above devices may be connected by one or more network(s) 708. Note that the remote devices can be embodied both as mobile devices such as smart phones or tablets, as well as stationary devices such as desktops, server devices, stand-alone kiosks, etc. Likewise, the servers can be implemented using various types of computing devices. In some cases, any of the devices shown in FIG. 7, but particularly the servers, can be implemented in data centers, server farms, etc.

Generally, the devices 702(A), 702(B), 704, and 706 may have respective processing resources 710 and storage resources 712, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as computer-readable instructions that are stored on persistent storage devices such as the storage resources, loaded into the random-access memory devices, and read from the random-access memory by the processing resources for execution.

Remote devices 702(A) and 702(B) can include a reporting module 714 that can interact with a management module 716 on server 704 and/or a tenant module 718 on server 706. Generally speaking, reporting module 714 can act as an agent that operates on the remote devices, and can provide certain device state information regarding the remote devices to the management module. The device state information can include system configuration settings, as well as system policy data and software data, such as operating system version data, that may be utilized by management module 716 to appropriately categorize the remote devices for co-management enrollment.

Management module 716 can further be used to display appropriate categorization information to an IT administrator who may be utilizing cloud management server 704, such as by displaying via a variety of GUIs information regarding the co-management enrollment status of remote devices. Upon selection of various options by the IT administrator, management module 716 can then automatically initiate co-management enrollment on the remote devices without additional user input at the location of the remote devices.

Example Automatic Configuration Method

Figure 8:
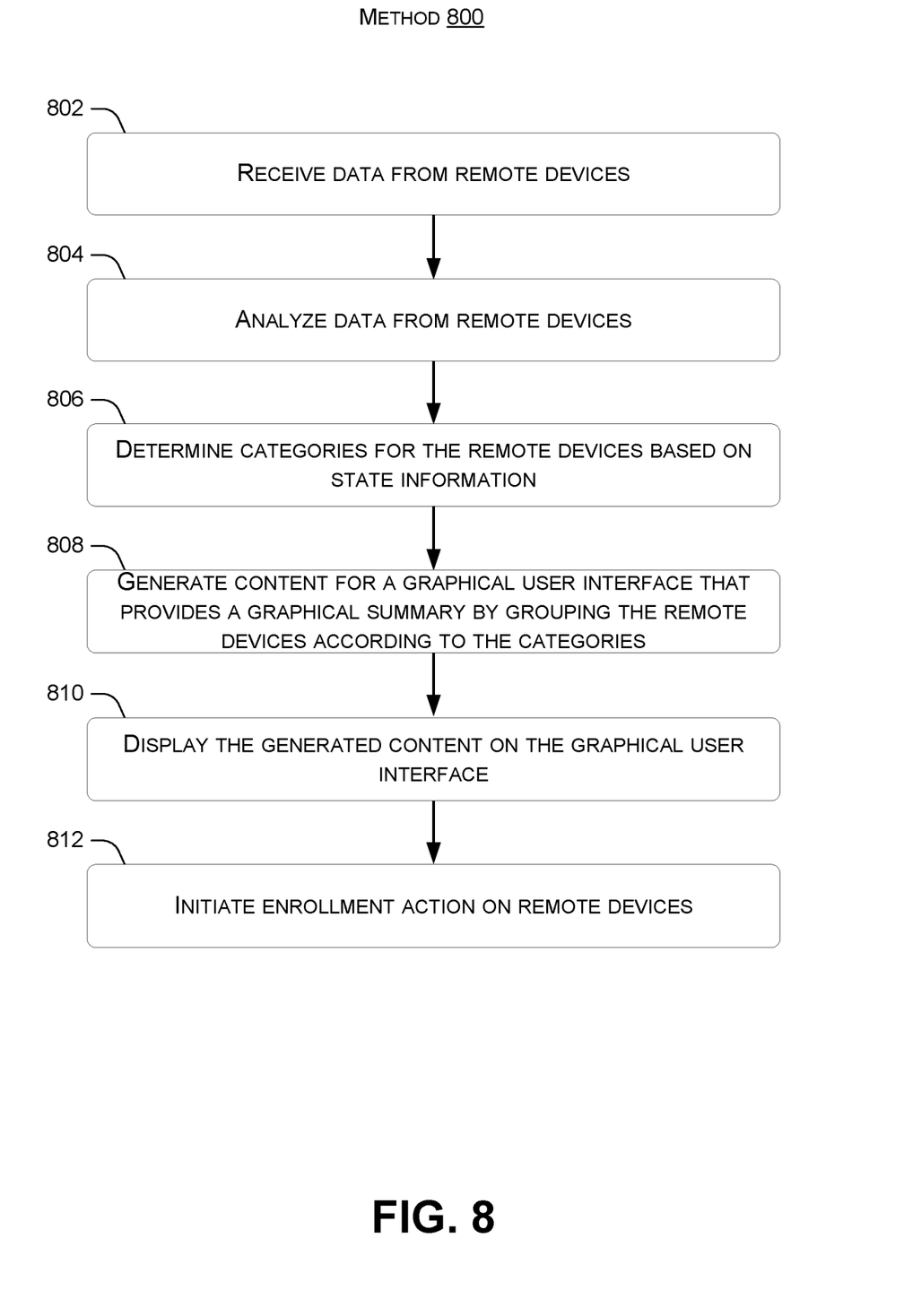
FIG. 8 illustrates an example method or technique that is consistent with some implementations of the present concepts.

The following discussion presents an overview of co-management enrollment functionality described above. FIG. 8 illustrates an example method 800, consistent with the present concepts.

At block 802, cloud management server 704 may receive data from the remote devices. For example, cloud management server 704 may receive state information from remote devices 702(A) and 702(B). Such state information may include information regarding system policy data and operation system version data.

At block 804, cloud management server 704 may analyze the data received from the remote devices. For example, based on the received data, cloud management server 704 may determine that certain devices may be eligible for co-management enrollment, while other devices may require particular policy or software upgrades in order to be eligible for co-management enrollment.

At block 806, cloud management server 704 may determine categories for each of the remote devices based on the state information. For example, cloud management server 704 may appropriately categorize a subset of the remote devices into a category that indicates that the subset of remote devices may need an operating system upgrade before being eligible for co-management enrollment.

At block 808, cloud management server 704 may generate content for a graphical user interface that provides a graphical summary of the categories by grouping the remote devices according to the categories, and at block 810, cloud management server 704 may display the generated content on the graphical user interface. For example, cloud management server 704 may display, via a graphical user interface, a graphical element that may provide a summary of the number of remote devices that fall within each category. Furthermore, the graphical user interface may display information that can enable an IT administrator to cure certain deficiencies of remote devices, in order to enable the devices to become eligible in co-management enrollment.

Finally, at block 812, the IT administrator may a co-management enrollment action on one or more of the remote devices. For example, the IT administrator may enroll a remote device into co-management, or may upgrade a co-management tier for a remote device to provide additional co-management functionality for the device.

Device Implementations

As noted with respect to FIG. 7, system 700 may include several components and/or devices, including remote devices 702(A) and 702(B), cloud management server 704, and identity management server 706. However, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability or resources and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Storage resources can be internal or external to any respective devices with which it is associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may be the storage resources.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Various examples are described above. Additional examples are described below. One example includes a system comprising a hardware processing unit and a storage resource storing computer-readable instructions that, when executed by the hardware processing unit, cause the hardware processing unit to: receive device information specifying device states associated with a plurality of remote devices, analyze the received device information to determine co-management categories for the plurality of remote devices based at least on device state information, the co-management categories representing a co-management state, display, via a graphical user interface, a listing of the plurality of remote devices, the determined co-management categories, and insight information on improving co-management states for the plurality of remote devices, receive user selections regarding the determined co-management categories via the graphical user interface, and issue instructions to individual remote devices from among the plurality of remote devices to cause a change in co-management functionality according to the received user selections.

Another example can include any of the above and/or below examples where the listing of the plurality of remote devices includes selectable links corresponding to each remote device, the selectable links presenting a graphical user interface allowing a user to trigger an enrollment action for each remote device.

Another example can include any of the above and/or below examples where the system further comprises computer-readable instructions that, when executed by the hardware processing unit, cause the hardware processing unit to issue a request to the plurality of remote devices to provide device state information of the remote devices.

Another example can include any of the above and/or below examples where the device state information includes system policy data and operating system version data.

Another example can include any of the above and/or below examples where the system further comprises computer-readable instructions that, when executed by the hardware processing unit, cause the hardware processing unit to issue a command to perform enrollment processing at the plurality of remote devices without user involvement local to the plurality of remote devices.

Another example can include any of the above and/or below examples where the co-management categories include an eligible category, an ineligible category, a co-managed category, a category reflecting a necessary identity management joining process, a category reflecting a necessary operating system upgrade, and a category reflecting a failed enrollment attempt.

Another example can include any of the above and/or below examples where the co-management categories include co-management tier categories.

Another example can include any of the above and/or below examples where the co-management tier categories provide for additional co-management functionality in higher tiers.

Another example can include any of the above and/or below examples where the system further comprises computer-readable instructions that, when executed by the hardware processing unit, cause the hardware processing unit to display, via the graphical user interface, insight information regarding steps that can be taken to upgrade the plurality of remote devices to upgraded co-management tier categories.

Another example can include any of the above and/or below examples where the system further comprises computer-readable instructions that, when executed by the hardware processing unit, cause the hardware processing unit to display, via the graphical user interface, a graphical summary of the remote devices by category grouping.

Another example includes a method comprising analyzing data received from a plurality of remote devices, determining categories for the plurality of remote devices regarding co-management between a local manager and a cloud manager, based at least on state information from the analyzed data, and generating content for a graphical user interface that provides a graphical summary of the plurality of remote devices by grouping the plurality of remote devices according to the determined categories.

Another example can include any of the above and/or below examples where the determined categories include an eligible category, an ineligible category, a co-managed category, a category reflecting a necessary identity management joining process, a category reflecting a necessary operating system upgrade, and a category reflecting a failed enrollment attempt.

Another example can include any of the above and/or below examples where the method further comprises displaying information regarding devices that have failed enrollment in co-management and additional steps that can be performed to remedy the failed enrollment.

Another example can include any of the above and/or below examples where the data from the plurality of remote devices is provided by a reporting module stored locally on the plurality of remote devices.

Another example can include any of the above and/or below examples where the determined categories include co-management tier categories, the co-management tier categories providing for additional co-management functionality in higher tiers.

Another example can include any of the above and/or below examples where the method further comprises displaying the generated content on the graphical user interface.

Another example includes a system comprises a hardware processing unit and a storage resource storing computer-readable instructions that, when executed by the hardware processing unit, cause the hardware processing unit to: receive data from a plurality of remote devices, analyze the data received from a plurality of remote devices, determine, based on state information associated with the plurality of remote devices, co-management tier categories for the plurality of remote devices, display, via a graphical user interface, the determined co-management tier categories for the plurality of remote devices, and responsive to receiving user selections via the displayed graphical user interface, cause instructions to be stored on individual remote devices that qualify for co-management, the instructions causing changes in co-management functionality of the individual remote devices.

Another example can include any of the above and/or below examples where the system further comprises computer-readable instructions that, when executed by the hardware processing unit, cause the hardware processing unit to display, via the graphical user interface, insight information regarding steps that can be taken to upgrade the plurality of remote devices to upgraded co-management tier categories.

Another example can include any of the above and/or below examples where the system further comprises computer-readable instructions that, when executed by the hardware processing unit, cause the hardware processing unit to display, via the graphical user interface, a graphical summary of the remote devices by co-management tier category grouping.

Another example can include any of the above and/or below examples where the co-management tier categories provide for additional co-management functionality in higher tiers.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
analyzing data received from a plurality of remote devices;
determining categories for the plurality of remote devices regarding co-management between a local manager and a cloud manager, based at least on state information from the analyzed data;
generating content for a graphical user interface that provides a graphical summary of the plurality of remote devices by grouping the plurality of remote devices according to the determined categories; and
responsive to user input received via the graphical user interface, issuing instructions to individual remote devices from among the plurality of remote devices to cause a change in co-management functionality according to the received user input,
wherein the issued instructions cause:
a first remote device to perform an operating system upgrade in order to meet a first prerequisite for co-management,
a second remote device to join a cloud-based identity and access management service in order to meet a second prerequisite for co-management,
a third remote device to perform policy synchronization in order to meet a third prerequisite for co-management, and
a fourth remote device to change a current state of an installed application in order to meet a fourth prerequisite for co-management.

2. The method of claim 1, wherein the determined categories include an eligible category, an ineligible category, a co-managed category, a category reflecting a necessary identity management joining process, a category reflecting a necessary operating system upgrade, and a category reflecting a failed enrollment attempt.

3. The method of claim 2, further comprising displaying information regarding devices that have failed enrollment in co-management and additional steps that can be performed to remedy the failed enrollment.

4. The method of claim 1, wherein the data from the plurality of remote devices is provided by a reporting module stored locally on the plurality of remote devices.

5. The method of claim 1, wherein the determined categories include co-management tier categories, the co-management tier categories providing for additional co-management functionality in higher tiers.

6. The method of claim 1, further comprising displaying the generated content on the graphical user interface.

7. A system comprising:
a hardware processing unit; and
a storage resource storing computer-readable instructions that, when executed by the hardware processing unit, cause the hardware processing unit to:
receive data from a plurality of remote devices;
analyze the data received from the plurality of remote devices;
determine, based on state information associated with the plurality of remote devices, co-management tier categories for the plurality of remote devices;
display, via a graphical user interface, the determined co-management tier categories for the plurality of remote devices; and
responsive to receiving user selections via the displayed graphical user interface, cause instructions to be issued to individual remote devices, wherein the issued instructions cause:
a first remote device to perform an operating system upgrade in order to meet a first prerequisite for co-management,
a second remote device to join a cloud-based identity and access management service in order to meet a second prerequisite for co-management,
a third remote device to perform policy synchronization in order to meet a third prerequisite for co-management, and
a fourth remote device to change a current state of an installed application in order to meet a fourth prerequisite for co-management.

8. The system of claim 7, further comprising computer-readable instructions that, when executed by the hardware processing unit, cause the hardware processing unit to display, via the graphical user interface, insight information regarding steps that can be taken to upgrade the plurality of remote devices to upgraded co-management tier categories.

9. The system of claim 7, further comprising computer-readable instructions that, when executed by the hardware processing unit, cause the hardware processing unit to display, via the graphical user interface, a graphical summary of the remote devices by co-management tier category grouping.

10. The system of claim 7, wherein the co-management tier categories provide for additional co-management functionality in higher tiers.

11. A system comprising:
a hardware processing unit; and
a storage resource storing computer-readable instructions that, when executed by the hardware processing unit, cause the hardware processing unit to:
receive device information specifying device states associated with a plurality of remote devices;

analyze the received device information to determine co-management categories for the plurality of remote devices based at least on device state information, the co-management categories representing a co-management state;

display, via a graphical user interface, a listing of the plurality of remote devices, the determined co-management categories, and insight information on improving co-management states for the plurality of remote devices;

receive user selections regarding the determined co-management categories via the graphical user interface; and issue instructions to individual remote devices from among the plurality of remote devices to cause a change in co-management functionality according to the received user selections, wherein the issued instructions cause the individual remote devices to perform actions to meet one or more prerequisites for co-management of the individual remote devices, wherein the issued instructions cause:
- a first remote device to perform an operating system upgrade in order to meet a first prerequisite for co-management,
- a second remote device to join a cloud-based identity and access management service in order to meet a second prerequisite for co-management,
- a third remote device to perform policy synchronization in order to meet a third prerequisite for co-management, and
- a fourth remote device to change a current state of an installed application in order to meet a fourth prerequisite for co-management.

12. The system of claim 11, wherein the listing of the plurality of remote devices includes selectable links corresponding to each remote device, the selectable links allowing a user to trigger an enrollment action for each remote device.

13. The system of claim 11, further comprising computer-readable instructions that, when executed by the hardware processing unit, cause the hardware processing unit to issue a request to the plurality of remote devices to provide the device state information of the remote devices.

14. The system of claim 13, wherein the device state information includes system policy data and operating system version data.

15. The system of claim 11, further comprising computer-readable instructions that, when executed by the hardware processing unit, cause the hardware processing unit to issue a command to perform enrollment processing at the plurality of remote devices without user involvement local to the plurality of remote devices.

16. The system of claim 11, wherein the co-management categories include an eligible category, an ineligible category, a co-managed category, a category reflecting a necessary identity management joining process, a category reflecting a necessary operating system upgrade, and a category reflecting a failed enrollment attempt.

17. The system of claim 11, wherein the co-management categories include co-management tier categories.

18. The system of claim 17, wherein the co-management tier categories provide for additional co-management functionality in higher tiers.

19. The system of claim 17, further comprising computer-readable instructions that, when executed by the hardware processing unit, cause the hardware processing unit to display, via the graphical user interface, particular insight information regarding steps that can be taken to upgrade the plurality of remote devices to upgraded co-management tier categories.

20. The system of claim 11, further comprising computer-readable instructions that, when executed by the hardware processing unit, cause the hardware processing unit to display, via the graphical user interface, a graphical summary of the remote devices by category grouping.

21. The system of claim 11, further comprising computer-readable instructions that, when executed by the hardware processing unit, cause the hardware processing unit to:
- initiate a first co-management enrollment action by the first remote device after the operating system upgrade by the first remote device;
- initiate a second co-management enrollment action by the second remote device after the second remote device joins the cloud-based identity and access management service;
- initiate a third co-management enrollment action by the third remote device after the policy synchronization by the third remote device; and
- initiate a fourth co-management enrollment action by the fourth remote device after changing the current state of the installed application by the fourth remote device.

* * * * *